Patented June 30, 1942

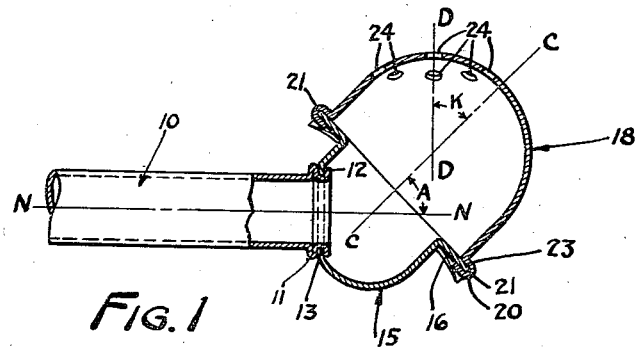
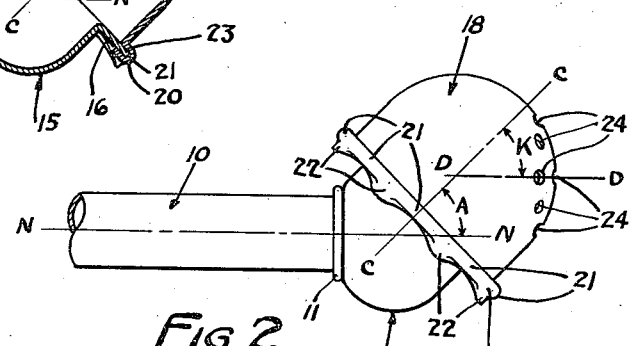
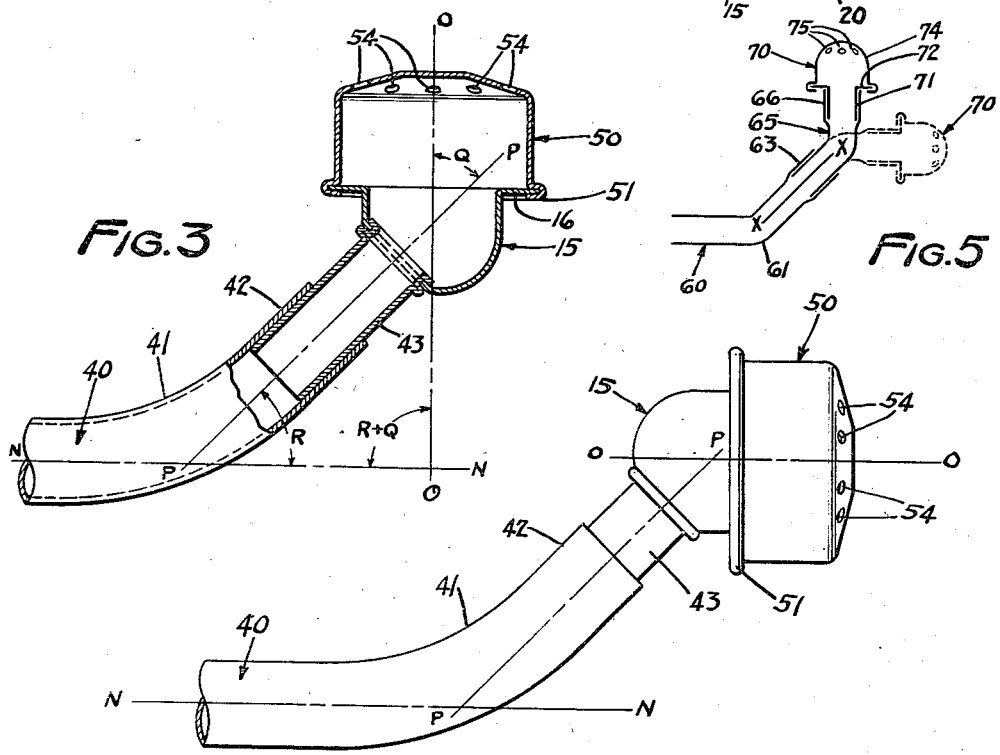

2,288,101

UNITED STATES PATENT OFFICE 2,288,101

ADJUSTABLE DUSTER NOZZLE

John Mayer, Hastings, Minn., assignor to H. D. Hudson Manufacturing Company, Chicago, Ill., a corporation of Minnesota Application June 15, 1940, Serial No. 340,742

5 Claims. (Cl. 43—147)

The present invention relates to an improved duster appliance, more particularly to an improved duster nozzle for hand and machine dusting apparatus.

In the dusting of plants, it is desirable to distribute the dust uniformly upon the top and also upon the bottom of leaves of plants since insects are found in both locations. Most insects customarily lay their eggs upon the bottom of the leaves and the larva and grubs hatching from the eggs generally begin eating the leaves near the point of hatching. Accordingly, it is important to dust both the tops and the bottoms of the leaves.

Apparatus heretofore perfected for accomplishing this purpose have dust discharge openings positioned in the duster nozzle so as to be alternately opened, some of the openings being positioned for straight ahead dusting in which the tops of the leaves are dusted, and others of the openings being positioned for discharging the dust at an angle to the axis of the dust delivery tube for under leaf dusting. While satisfactory in operation, such apparatus has been expensive to manufacture and it is accordingly an object of the present invention to provide an efficient inexpensive duster nozzle which is provided with an opening or set of openings which may be directed for either under leaf or straight ahead dusting.

It is a further object of the invention to provide such an apparatus of inexpensive construction and one which will provide a more uniform distribution of dust whether used for straight ahead (top leaf) or angle (under leaf) dusting.

These and other objects of the invention are those inherent in the apparatus illustrated, described and claimed.

Throughout the drawing, corresponding numerals designate corresponding parts.

Figure 1 of the drawing is a side elevational view partly in section of the apparatus of the present invention showing the dust discharge nozzles arranged for under leaf dusting.

Figure 2 is a side elevational view showing the nozzle structure of Figure 1 arranged for straight ahead dusting.

Figure 3 is a side elevational view partly in section of a modified form of the invention shown in Figure 1 showing the dust discharge openings arranged for under leaf dusting.

Figure 4 is a side elevational view of the duster nozzle shown in Figure 3 showing the dust discharge openings arranged for straight ahead dusting.

Figure 5 is a side elevational view of a second slightly modified form of the invention.

Referring now to Figures 1 and 2, the duster appliance consists of a dust discharge tube, generally designated 10, which is preferably made of thin walled sheet metal. Near the end of the tube, there is rolled a double crimp portion 11, which has a forwardly and outwardly extending flange portion 12. The flange portion 12 is inserted through and crimped over the edge of an opening 13 in a cup piece, generally designed 15, of the nozzle. The nozzle cup piece generally designated 15 is of generally hemispherical configuration and has an outwardly extending flange 16. Upon the flange 16, there is mounted a nozzle cap member, generally designated 18, which has an inturned flange 20 gripping the outwardly extending flange 16 of the cup piece.

Referring to Figure 2, it will be noted that the crimping of the inturned flange 20 is complete at the portions 21 and is incomplete at the portions 22. This method of crimping provides an irregular edge which may be gripped firmly by the operator so as to rotate the nozzle cap member 18 upon the nozzle cup piece 15. In this connection, it is noted that the seat between the outwardly turned flange 16 and the inturned flange 20 is such as to provide a dust tight connection at the flange rim 23, which is nevertheless sufficiently free so that the cap 18 may be rotated upon the cup piece 15.

The line N—N denotes the axis of the dust delivery tube, the line C—C in turn denotes the axis of the nozzle, this being the axis of the cup portion 15 and also the axis of rotation of the nozzle cap 18. The angle A between the axis N—N of the dust delivery tube, and the axis C—C of the nozzle is preferably made approximately 45 degrees, although other angles may be used if desired.

In the nozzle cap member 18 there are a plurality of dust discharge openings 24, the central axis of which is denoted by the line D—D. The dust discharge openings are so arranged that the dust is discharged in a cloud the central axis of which is along line D—D so that the angle K between the axis C—C and the axis D—D is approximately 45 degrees. This angle likewise may, if desired, be varied somewhat from the 45 degree angle although it is preferably made equal to the angle A.

It will be observed, therefore, that when the nozzle cap 18 is rotated on the axis C—C so that the dust discharge openings 24 are in the position shown in Figure 1, the dust will be discharged at approximately 90 degrees to the axis N—N of the dust delivery tube, and therefore, when the dust delivery tube is held downwardly from the operator at an angle of approximately 45 degrees, the dust will be discharged upwardly at approximately 45 degrees and will be efficiently directed as a cloud of dust for under leaf dusting. In order to provide straight ahead dusting, the cap member 18 is rotated to the position shown in Figure 2 in which position the axis D—D is brought parallel with the axis N—N of the dust discharge tube 10. When thus arranged, the dust is discharged in a cloud straight ahead from the dust discharge tube and in this position may efficiently be used for dusting the tops of the leaves.

It will likewise be observed that by rotating the nozzle cap member 18, the angularity between the dust discharge axis D—D and the dust delivery tube axis N—N may be varied from 0 degrees to 90 degrees. Indeed, if the angles A and K are increased to more than 45 degrees, the maximum total angle between the axes D—D and N—N may be made greater than 90 degrees. In this manner, efficient dusting in any direction may be achieved.

In the modified form of the invention shown in Figures 3 and 4, the dust delivery tube 40 has an axis N—N and is provided with a curve at 41 so that a portion 42 of the dust discharge delivery tube is directed along the axis P—P. Within the portion 42, there is rotatably mounted a sleeve 43, which has crimped on it a nozzle cup 15 of generally hemispherical configuration, which may be indentical with that shown in Figures 1 and 2. Upon the outwardly turned flange 16 of the cup 15, there is crimped a nozzle cap member, generally designated 50, the crimping in this instance being completed all around as shown at 51. The cap 50 is non-rotatable on the cup 15. The cap member 50 is rotatable about the axis O—O, and the head 50 is provided with a plurality of dust discharge openings 54, which are so arranged that they discharge dust along the same axis O—O. The angle Q between the dust discharge axis O—O and the axis of rotation of the head P—P is made approximately 45 degrees and the angle R between the axis P—P and the principal axis N—N of the dust discharge tube is likewise made approximately 45 degrees. Accordingly, the head 50 may be rotated about the axis P—P so that the total angle R and Q between the axis O—O and the axis N—N is approximately 90 degrees.

Likewise, as shown in Figure 4, the cup 15 and head 50 may be rotated about the axis P—P so that the dust discharge axis O—O is substantially parallel with the principal axis N—N of the dust discharge tube.

It is obvious that many variations may be made in the details of the apparatus without departing from the spirit of the invention described and claimed. Thus as shown in Figure 5 the dust delivery tube 60 is shown as bent at an angle of 45 degrees at 61, and as being joined at 63 in snug fitting relation to a similarly bent tube 65. The tube 65 is provided with a slip joint at 66 by which the head 70 is connected to the unit. The duster head is composed of a tube 71 flanged outwardly at 72 to receive a cap piece 74 which is crimped solidly to the tube 71 at flange 72. The cap is provided with dust apertures 75. By rotating the tube 65 and attached cap 70 about the axis X—X from the full line to the dotted line positions dusting may be done in either the underleaf or top leaf conditions.

Other possible variations of the invention will be obvious to those skilled in the art.

What I claim is:

1. A duster appliance comprising a dust delivery tube, a hollow sheet metal cup piece secured to the sheet metal tube in a position such that the edge of the cup lies in a plane at an angle of less than ninety degrees to the axis of the tube, and a cap for the cup attached to the edge for rotation thereon, said cap having an opening positioned for discharging dust at an angle to axis of rotation of said cap.

2. A duster appliance comprising a hollow dust delivery tube, a sheet metal cup piece of generally hemispherical shape secured to the tube, said tube and cup piece being positioned with respect to each other so that the edge of the cup is in a plane at an angle of less than ninety degrees to the axis of the dust delivery tube, said cup piece having an outwardly turned flange, and a cup enclosure member of generally hemispherical shape having an inturned flange gripping the outwardly extending flange of the cup piece, so as to be rotatable thereon, said enclosure member being provided with a dust discharge opening which is positioned to discharge dust along an axis at an angle of less than ninety degrees to the axis of rotation of said enclosure upon the cup piece.

3. A structure of the type described in claim 2 wherein the inturned flange of the enclosure is irregularly crimped to provide a gripping portion for rotating the enclosure member.

4. A duster appliance comprising a dust delivery tube, a hollow cup piece secured to one end of said tube in a position such that the edge of the cup lies in a plane at an angle of less than ninety degrees to the axis of the tube, and a cap for the cup attached to the edge thereof and adapted for rotation thereon, said cap having an opening positioned for discharging dust at an angle to the axis of rotation of the cup.

5. An adjustable duster nozzle comprising a cup-shaped member having an outwardly turned annular flange, an opening in the wall of said cup-shaped member having its axis disposed at an angle to the plane of said flange, a dust delivery tube having one end secured in said opening, and a cap having an annular recess receiving the marginal edge of said flange and whereby the cap is rotatable on the cup-shaped member, and said cap having dust discharge perforations in a wall thereof disposed at an angle to the axis of the cap, whereby when the cap is in one position on the cup-shaped member, the axis of the path of dust discharge may be at right angles to the axis of the tube, and when in another position, the axis of the path of dust discharge may be substantially parallel to the axis of the tube.

JOHN MAYER.